United States Patent
Hamilton

(10) Patent No.: US 8,902,926 B2
(45) Date of Patent: Dec. 2, 2014

(54) PORTABLE VOICE AND DATA RADIO BASE STATION

(75) Inventor: Craig Hamilton, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1329 days.

(21) Appl. No.: 11/849,020

(22) Filed: Aug. 31, 2007

(65) Prior Publication Data

US 2009/0059836 A1    Mar. 5, 2009

(51) Int. Cl.
*H04J 3/22* (2006.01)
*H04W 88/08* (2009.01)
*H04W 84/04* (2009.01)

(52) U.S. Cl.
CPC .......... *H04W 88/085* (2013.01); *H04W 84/045* (2013.01)
USPC ............ 370/467; 370/328; 370/401; 455/561

(58) Field of Classification Search
USPC ......... 370/265, 310, 311, 313, 328, 329, 352, 370/356, 360, 389, 392, 400, 401, 465, 466, 370/467, 493, 522; 379/420.04, 446, 379/428.04, 447; 455/74.1, 90.3, 426.1–2, 455/444, 462, 561, 556.1–2, 569.1, 573
See application file for complete search history.

(56) References Cited

U.S. PATENT DOCUMENTS

| | | | |
|---|---|---|---|
| 7,327,981 B2 * | 2/2008 | Hundal ........................ | 455/41.2 |
| 2002/0160791 A1 * | 10/2002 | Markowitz ................... | 455/462 |
| 2004/0072593 A1 * | 4/2004 | Robbins et al. ............... | 455/560 |
| 2004/0179512 A1 * | 9/2004 | Leblanc et al. ............... | 370/352 |
| 2005/0068938 A1 * | 3/2005 | Wang et al. ................... | 370/352 |
| 2006/0068815 A1 * | 3/2006 | Caspi et al. ................... | 455/466 |
| 2006/0172769 A1 * | 8/2006 | Oh ................................. | 455/557 |
| 2006/0203778 A1 * | 9/2006 | Han et al. ...................... | 370/335 |

* cited by examiner

*Primary Examiner* — Robert C Scheibel
*Assistant Examiner* — Mark A Mais
(74) *Attorney, Agent, or Firm* — Fulbright & Jaworski LLP

(57) ABSTRACT

Various embodiments are directed to a portable voice and data radio base station to couple to a mobile computing device. When coupled, the portable voice and data radio base station and the mobile computing device may cooperatively form a wireless access point to enable communications among a network and other local wireless communication devices. Other embodiments are described and claimed.

28 Claims, 3 Drawing Sheets

---

300

```
COUPLE A PORTABLE BASE STATION TO
A MOBILE COMPUTING DEVICE
302
           │
           ▼
ESTABLISH A WIRELESS COMMUNICATION LINK FROM
THE MOBILE COMPUTING DEVICE TO A NETWORK
304
           │
           ▼
ESTABLISH A LOCAL WIRELESS CONNECTION FROM
THE PORTABLE BASE STATION TO
A WIRELESS COMMUNICATION DEVICE WITHIN RANGE
306
           │
           ▼
PROVIDE THE WIRELESS COMMUNICATION DEVICE WITH
ACCESS TO THE NETWORK THROUGH
THE LOCAL WIRELESS CONNECTION AND OVER
THE WIRELESS COMMUNICATION LINK
308
```

PORTABLE VOICE AND DATA RADIO BASE STATION

BACKGROUND

A mobile computing device such as a combination handheld computer and mobile telephone or smart phone generally may provide voice and data communications functionality, as well as computing and processing capabilities. As wireless data rates increase, having a mobile computing device may lessen or eliminate the need to have a separate home digital subscriber line (DSL) or cable modem network connection especially in cases where a subscriber has purchased an unlimited data plan as part of a wireless service subscription.

In addition, having both a home telephone number and a mobile telephone number often may result in missed voice calls such as when an incoming voice call is directed to the mobile number of a subscriber who is at home and not carrying the mobile computing device.

Accordingly, there exists the need for devices and techniques for improving wireless voice and data communications.

DETAILED DESCRIPTION

Various embodiments are directed to a portable voice and data radio base station to couple to a mobile computing device. When coupled, the portable voice and data radio base station and the mobile computing device may cooperatively form a wireless access point to enable communications among a network and other local wireless communication devices. In some embodiments, the portable voice and data radio base station coupled to the mobile computing device may communicate with a network over a wireless communication link and establish a local wireless connection to a wireless communication device within range. In such embodiments, the portable voice and data radio base station may provide the wireless communication device with access to the network through the local wireless connection and over the wireless communication link established between the mobile computing device and the network.

In some embodiments, the portable voice and data radio base station coupled to the mobile computing device may receive an incoming voice call directed to a mobile telephone number of the mobile computing device. In response, the portable voice and data radio base station coupled to the mobile computing device may transmit a ringer signal to one or more cordless telephone handsets within range which may be used to answer and take the incoming voice call. Similarly, a cordless telephone handset within range of the portable voice and data radio base station coupled to the mobile computing device may be used to dial and make an outgoing voice call. In such embodiments, voice calls may be connected and routed through the portable voice and data radio base station coupled to the mobile computing device.

Figure 1:
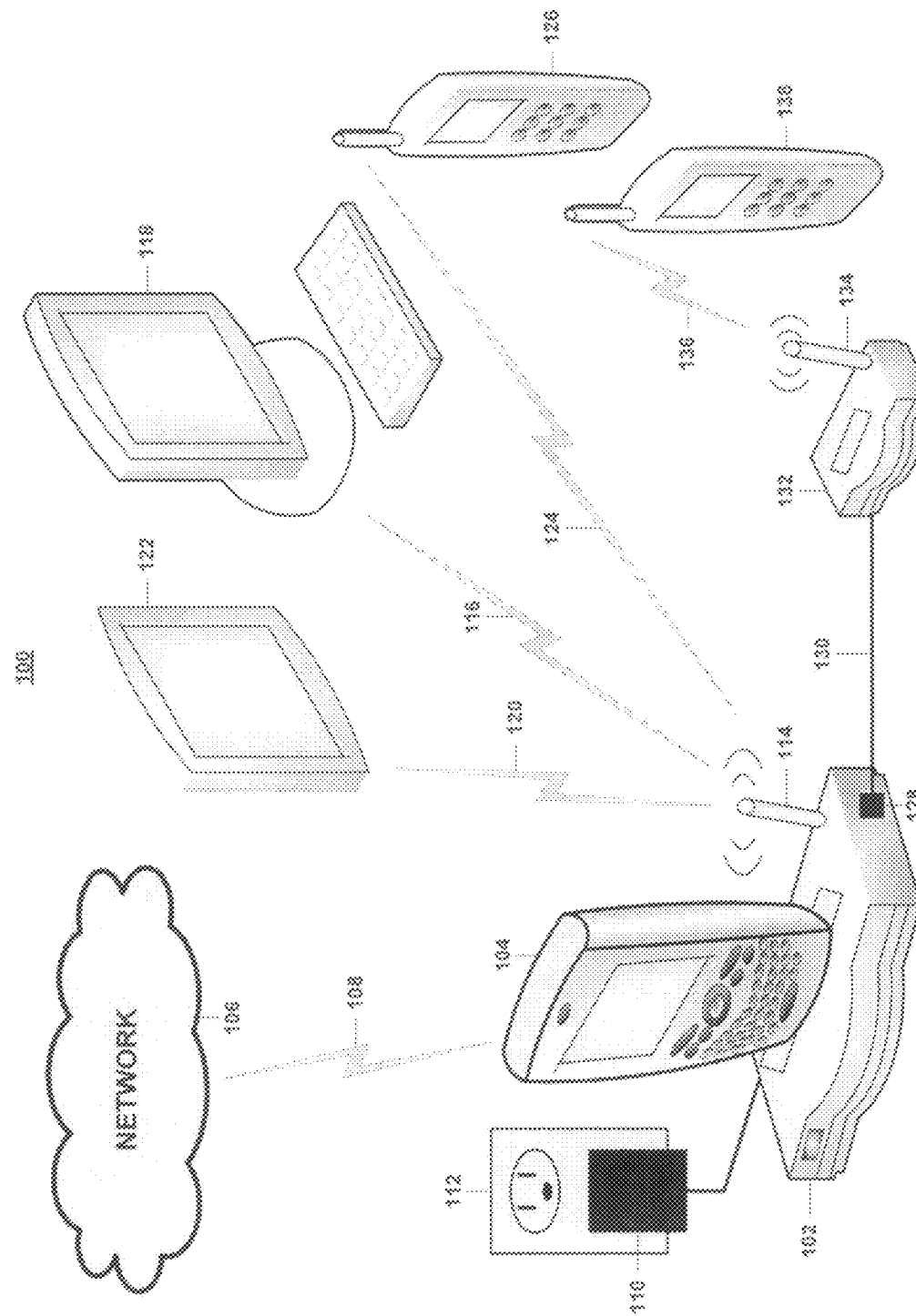
FIG. 1 illustrates a communications system comprising a portable voice and data radio base station in accordance with various embodiments.

FIG. 1 illustrates one embodiment of a communications system 100 comprising multiple nodes. Each node generally may comprise a physical or logical entity for communicating information within communications system 100 and may be implemented as hardware, software, or combination thereof, as desired for a given set of design parameters or performance constraints. Although FIG. 1 includes a limited number of nodes for purposes of illustration, it can be appreciated that communications system 100 may include more or less nodes as desired for a given implementation as well as other types of nodes in accordance with the described embodiments.

As shown, communications system 100 may comprise a portable voice and data radio base station (PBS) 102 coupled to a mobile computing device 104. Mobile computing device 104 may comprise or be implemented as a combination handheld computer and mobile telephone or smart phone such as a Palm® Treo™ smart phone. Although some embodiments may be described with mobile computing device 104 implemented as a smart phone by way of example, it may be appreciated that mobile computing device 104 may be implemented as other types of wireless computing devices having voice and/or data communications functionality such as a handheld device, personal digital assistant (PDA), mobile telephone, combination mobile telephone/PDA, mobile unit, subscriber station, game device, messaging device, media player, pager, or any other suitable communications device in accordance with the described embodiments.

Mobile computing device 104 may comprise a housing encapsulating various internal components such as a printed circuit board (PCB), internal antennas, a removable and rechargeable battery, as well as one or more processors (e.g., host processor, radio processor, modem processor, baseband processor), memory (e.g., volatile or non-volatile memory, removable or non-removable memory, erasable or non-erasable memory, writeable or re-writeable memory), transceivers (e.g., voice communications transceiver, data communications transceiver, GPS transceiver), and others. Mobile computing device 104 also may comprise various input/output (I/O) devices such as a keyboard, keys, buttons, switches, a microphone, speakers, an audio headset, a camera, a touch-sensitive display screen, a stylus, and so forth.

Mobile computing device 104 may be arranged to provide voice and data communications functionality by connecting to a network 106 over a wireless communication link 108. For example, mobile computing device 104 may provide voice communications functionality in accordance with one or more cellular telephone networks or systems. Examples of cellular telephone networks or systems may include Code Division Multiple Access (CDMA), Global System for Mobile Communications (GSM), North American Digital Cellular (NADC), Time Division Multiple Access (TDMA), Extended-TDMA (E-TDMA), Narrowband Advanced Mobile Phone Service (NAMPS), third generation (3G) networks or systems such as Wide-band CDMA (WCDMA), CDMA-2000, Universal Mobile Telephone System (UMTS), and others.

In addition to voice communications functionality, mobile computing device 104 may provide wireless wide area network (WWAN) data communications functionality including Internet access in accordance with one or more cellular telephone networks or systems. Examples of cellular telephone networks or systems offering WWAN data communications services may include Evolution-Data Optimized or Evolution-Data only (EV-DO), Evolution For Data and Voice (EV-DV), CDMA/1xRTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others.

Mobile computing device 104 also may be arranged to provide data communications functionality in accordance with various types of wireless local area network (WLAN) systems. Examples of suitable WLAN systems offering data communications services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and others.

Mobile computing device 104 may be arranged to perform data communications functionality in accordance with various types of shorter range wireless networks or systems, such as a wireless personal area network (PAN) offering Bluetooth® data communications services in accordance with the Bluetooth® Special Interest Group (SIG) series of protocols, specifications, profiles, and so forth. Other examples of shorter range wireless networks or systems may employ infrared (IR) techniques or near-field communication techniques and protocols, such as electro-magnetic induction (EMI) techniques. Exemplary EMI techniques may include passive or active radio-frequency identification (RFID) protocols and devices.

In some cases, mobile computing device 104 may be implemented as a multi-band wireless device supporting operation in multiple frequency bands. For example, mobile computing device 104 may be arranged to operate in various frequency bands or sub-bands such as the 2.4 GHz range of the ISM frequency band for WiFi and Bluetooth® communications, one or more of the 850 MHz, 900 MHZ, 1800 MHz, and 1900 MHz frequency bands for GSM, CDMA, TDMA, NAMPS, cellular, and/or PCS communications, the 2100 MHz frequency band for CDMA2000/EV-DO and/or WCDMA/UMTS communications, the 1575 MHz frequency band for Global Positioning System (GPS) operations, and other frequency bands.

Mobile computing device 104 may comprise an antenna system including one or more internal and/or external antennas tuned for operating at one or more frequency bands. This may be desirable since mobile computing device 104 may be compatible with multiple wireless data, multimedia, and/or cellular telephone networks or systems.

Mobile computing device 104 may comprise one or more transceivers arranged to communicate using different types of protocols, communication ranges, operating power requirements, RF sub-bands, information types (e.g., voice or data), use scenarios, applications, and so forth. Mobile computing device 104 may comprise, for example, one or more cellular transceivers or components arranged to support communication over a cellular voice channel for a network such as CDMA, GSM, and/or UMTS. Mobile computing device 104 also may comprise one or more WWAN transceivers or components arranged to support data communication over a WWAN data channel in accordance with one or more WWAN protocols such as EVDO protocols, EVDV protocols, CDMA/1xRTT protocols, GSM/GPRS protocols, EDGE protocols, HSDPA protocols, and so forth. Mobile computing device 104 also may comprise one or more transceivers or components arranged to support data communication over a WLAN data channel in accordance with one or more WLAN protocols such as IEEE 802.11a/b/g/n protocols, IEEE 802.16 protocols, IEEE 802.20 protocols, PAN protocols, Infrared protocols, Bluetooth® protocols, EMI protocols including passive or active RFID protocols, and so forth. In some implementations, mobile computing device 104 may comprise a GPS transceiver to support position determination capabilities and/or location-based services.

As shown in FIG. 1, PBS 102 may be arranged to couple to mobile computing device 104. When coupled, PBS 102 and mobile computing device 104 may cooperatively form a wireless access point to enable communications among network 106 and other local wireless communication devices. In various implementations, the functionality of PBS 102 may be limited when not coupled to mobile computing device 104. Namely, PBS 102 alone may be incapable of connecting to network 106. Accordingly, PBS 102 requires cooperation and coupling with mobile computing device 104 in order to function as a wireless access point.

In some embodiments, mobile computing device 104 may comprise a multi-connector (e.g., power, audio, data interface) to allow wired connection or direct contact between mobile computing device 104 and PBS 102. The wired connection may comprise, for example, a serial connection such as a Universal Serial Bus (USB) connection or other wired connection in accordance with the described embodiments. PBS 102 and mobile computing device 104 also may have short range wireless capability such as integrated Bluetooth® wireless capability. In such implementations, PBS 102 and mobile computing device 104 may be coupled by a short range wireless connection (e.g., Bluetooth® connection).

When coupled to PBS 102, mobile computing device 104 may communicate data to and from PBS 102. For example, mobile computing device 104 may communicate data received from network 106 over wireless communication link 108 to PBS 102. Mobile computing device 104 also may communicate data received from PBS 102 and other devices to network 106 over wireless communication link 108.

Additionally, when mobile computing device 104 is seated within or is otherwise directly connected to PBS 102, mobile computing device 104 may receive power from PBS 102. As shown, PBS 102 may comprise an AC adapter 110 to plug in to power outlet 112 for supplying power to PBS 102 and mobile computing device 104. Accordingly, PBS 102 may supply power to and/or recharge the battery (e.g., lithium ion battery) of mobile computing device 104.

PBS 102 coupled to mobile computing device 104 may communicate with network 106 over wireless communication link 108 and establish a local wireless connection to a wireless communication device within range. Using antenna 114, PBS 102 may establish a local wireless connection 116 (e.g., WiFi connection) to personal computer (PC) 118. As such, PBS 102 when coupled to mobile computing device 104 may provide PC 118 with access to network 106 through the local wireless connection 114 and over wireless communication link 108 established between mobile computing device 104 and network 106. Accordingly, network access may be provided at the home of a user or wherever the user desires. In addition, the need for a Simple Mail Transport Protocol (SMTP) gateway when sending via an Internet Service Provider (ISP) is avoided.

Although PC 118 is shown for purposes of illustration, it can be appreciated that a local wireless connection may be established from PBS 102 to various types of wireless communication devices such as a laptop computer, handheld device, PDA, mobile telephone, combination mobile telephone/PDA, mobile unit, subscriber station, user terminal, portable computing device, game device, messaging device, media player, pager, data communication device, or any other suitable computing or processing system having a wireless adapter.

PBS 102 coupled to mobile computing device 104 may communicate with network 106 over wireless communication link 108 and establish a local wireless connection 120 (e.g., Bluetooth® connection) to a media device such as a television (TV) 122. In various embodiments, PBS 102 coupled to mobile computing device 104 may be arranged to receive media content from a media source over network 106. The media source generally may comprise various devices and/or systems capable of delivering static or dynamic media content. For example, the media source may comprise a multimedia server arranged to provide media downloads and/or streaming media content. As such, PBS 102 may store and/or provide media content received from network 106 over wireless communication link 108 and/or from mobile computing device 104 to TV 122 through the local wireless connection 120. In addition to media content, PBS 102 may be arranged to store various other types of data and/or files.

Although TV 122 is shown for purposes of illustration, it can be appreciated that a local wireless connection may be established from PBS 102 to various types of media devices such as a set-top box (STB) device, digital TV (DTV) device, high-definition TV (HDTV) device, direct broadcast satellite TV (DBS) device, video on-demand (VOD) device, Internet Protocol TV (IPTV) device, Web TV device, digital video recorder (DVR) device, digital versatile disc (DVD) device, high-definition DVD (HD-DVD) device, Blu-ray disc (BD) device, video home system (VHS) device, digital VHS device, entertainment system, media player, media appliance, audio/video (A/V) receiver, or any other suitable media device having wireless capability.

PBS 102 coupled to mobile computing device 104 may receive an incoming voice call directed to a mobile telephone number mobile computing device 104. In various embodiments, PBS 102 may respond using antenna 114 to transmit a ringer signal over a cordless telephone channel 124 to a cordless telephone handset 126 within range. Cordless telephone channel 124 may be used for transmitting the ringer signal and for carrying voice data and/or signals during a telephone call. In various embodiments, cordless telephone channel 124 may implemented by one or more frequency bands available for cordless telephone use such as 43-50 MHz, 900 MHz, 2.4 GHz, 5.8 GHz, and so forth.

Upon audibly announcing the incoming voice call, cordless telephone handset 126 may be used to answer and take the incoming voice call. Cordless telephone handset 126 within range of PBS 102 coupled to mobile computing device 104 also may be used to dial and make an outgoing voice call. In such embodiments, voice calls may be connected and routed through the PBS 102 coupled to mobile computing device 104. Accordingly, PBS 102 may be arranged keep a record of incoming and outgoing calls and may include voicemail functionality.

PBS 102 may comprise a telephone port 128 to receive a telephone cord 130 for connecting PBS 102 to a cordless telephone base 132 or landline telephone (not shown). In some embodiments, upon receiving an incoming voice call directed to a mobile telephone number of mobile computing device 104, PBS 102 may transmit a ringer signal over telephone cord 130 to cordless telephone base 132. In response, cordless telephone base 132 may use antenna 134 to transmit the ringer signal over cordless telephone channel 136 to a cordless telephone handset 138 within range. Cordless telephone handset 138 may be used to answer and take an incoming voice call as well as to dial and make an outgoing voice call. PBS 102 may comprise an AC adapter (not shown) to plug in to a power outlet for supplying power to and/or recharging the battery of cordless telephone handset 138.

In some embodiments, upon receiving an incoming voice call directed to a mobile telephone number of mobile computing device 104, PBS 102 may transmit a ringer signal over telephone cord 130 to a landline telephone which may be used to answer and take an incoming voice call as well as to dial and make an outgoing voice call.

Figure 2:
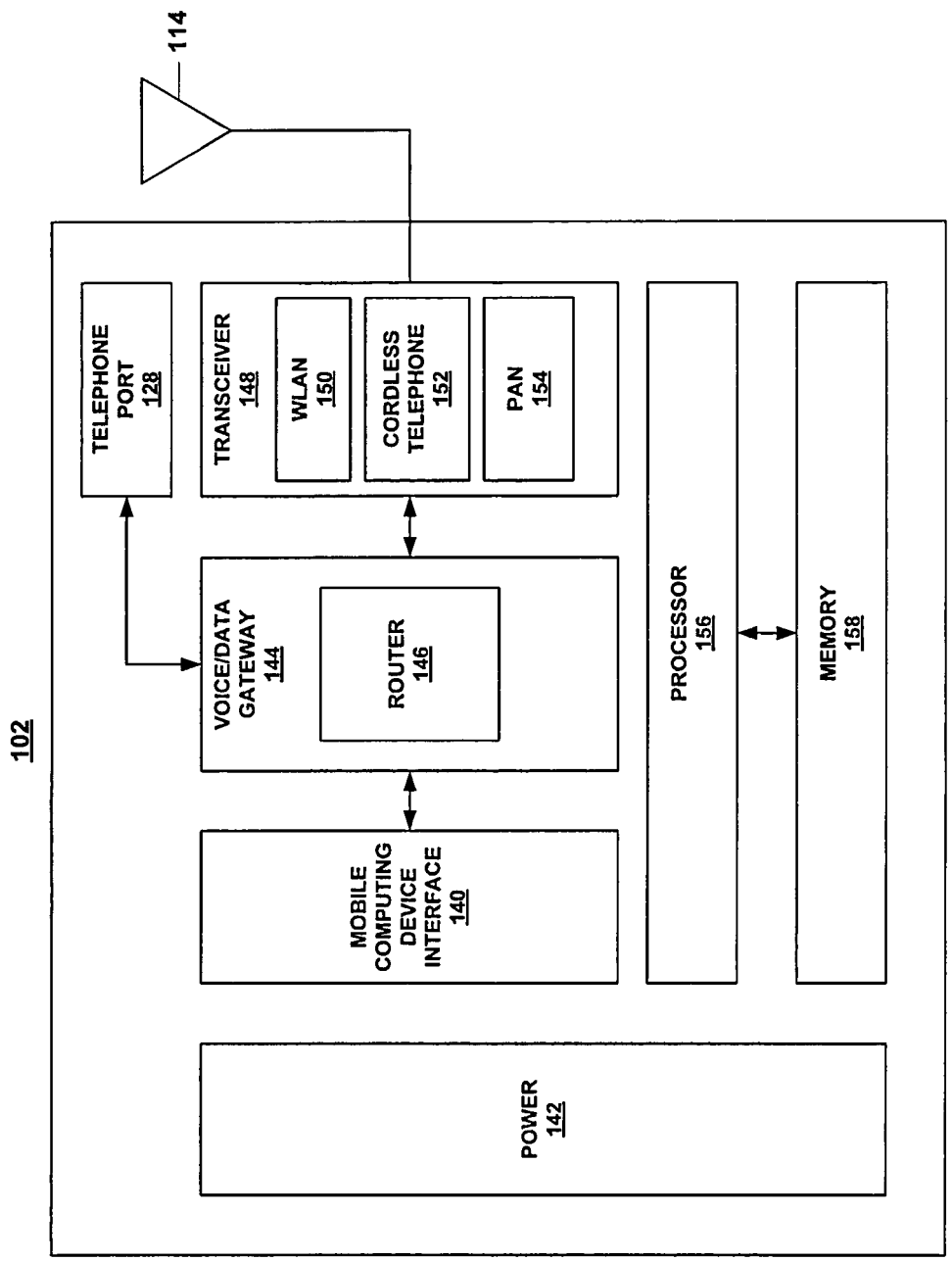
FIG. 2 illustrates a portable voice and data radio base station in accordance with various embodiments.

FIG. 2 illustrates one embodiment of PBS 102. In various embodiments, PBS 102 may be configured to cooperate and couple with a mobile compute device (e.g., mobile computing device 104), as described above. When coupled, PBS 102 and a mobile computing device may cooperatively form a wireless access point to enable communications among a network and/or other local wireless communication devices.

As shown, PBS 102 may comprise a mobile computing device interface 140 for coupling to a mobile computing device. Mobile computing device interface 140 may allow wired connection (e.g., USB connection) or direct contact between a mobile computing device and PBS 102. In some embodiments, mobile computing device interface 140 may be used to couple PBS 102 to a mobile computing device by a short range wireless connection (e.g., Bluetooth® connection).

PBS 102 may comprise a power subsystem 142 for supplying power to PBS 102. In addition, when a mobile computing device is seated within or is otherwise directly connected to PBS 102, power subsystem 142 may supply power to and/or recharge the battery (e.g., lithium ion battery) of the mobile computing device. Power subsystem 142 may comprise, for example, an AC adapter to plug in to a power outlet for supplying power to PBS 102 and the mobile computing device. In some embodiments, power subsystem 142 may comprise a battery such as a rechargeable and/or replaceable battery (e.g., D-Cell alkaline/Fuel Cell). When operating using battery power, PBS 102 may function for a certain period of time so long as power is available at the cell tower even if power is interrupted at the home of the user. In addition, the battery may allow the mobile computing device to continue to be charged even in the absence of power to the home of the user.

PBS 102 may comprise a voice/data gateway 144 for communicating voice and other types of data to and from mobile computing device interface 140. When coupled to PBS 102, a mobile computing device may communicate voice and other types of data to and from PBS 102. Voice/data gateway 144 may comprise a router 146 for appropriately directing voice and other types of data.

PBS 102 may comprise a transceiver module 148 including one or more transceivers arranged to communicate using antenna 114 in accordance with various types of protocols, communication ranges, operating power requirements, RF sub-bands, information types (e.g., voice or data), use scenarios, applications, and so forth.

As shown, transceiver module 148 may comprise a WLAN transceiver 150 arranged to perform data communications in accordance with one or more WLAN protocols (e.g., IEEE 802.11a/b/g/n, IEEE 802.16, IEEE 802.20, etc.), a cordless telephone transceiver 152 arranged to communicate data to and from a cordless telephone handset over a cordless telephone channel, and a PAN transceiver 154 arranged to perform data communications in accordance with one or more short range protocols (e.g., Bluetooth® protocols, Infrared protocols, EMI protocols, etc.). PBS 102 also may comprise a telephone port 128 used to connect to a cordless telephone base.

PBS 102 may comprise a processor module 156 including one or more processors for performing operations in accordance with the described embodiments. Examples of a processor may include, without limitation, a central processing unit (CPU), general purpose processor, dedicated processor, chip multiprocessor (CMP), media processor, digital signal processor (DSP), microprocessor, controller, microcontroller, application specific integrated circuit (ASIC), field programmable gate array (FPGA), programmable logic device (PLD), or other suitable processing device in accordance with the described embodiments.

PBS 102 may comprise a memory 158 for storing data in accordance with the described embodiments. Memory 158 may comprise various types of computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable media in accordance with the described embodiments. It can be appreciated that memory 158 may be separate from a processor or may be included on the same integrated circuit as a processor. In some cases, some portion or the entire memory 158 may be disposed on an integrated circuit or other medium (e.g., hard disk drive, memory card) external to a processor and accessible via a memory bus.

Figure 3:
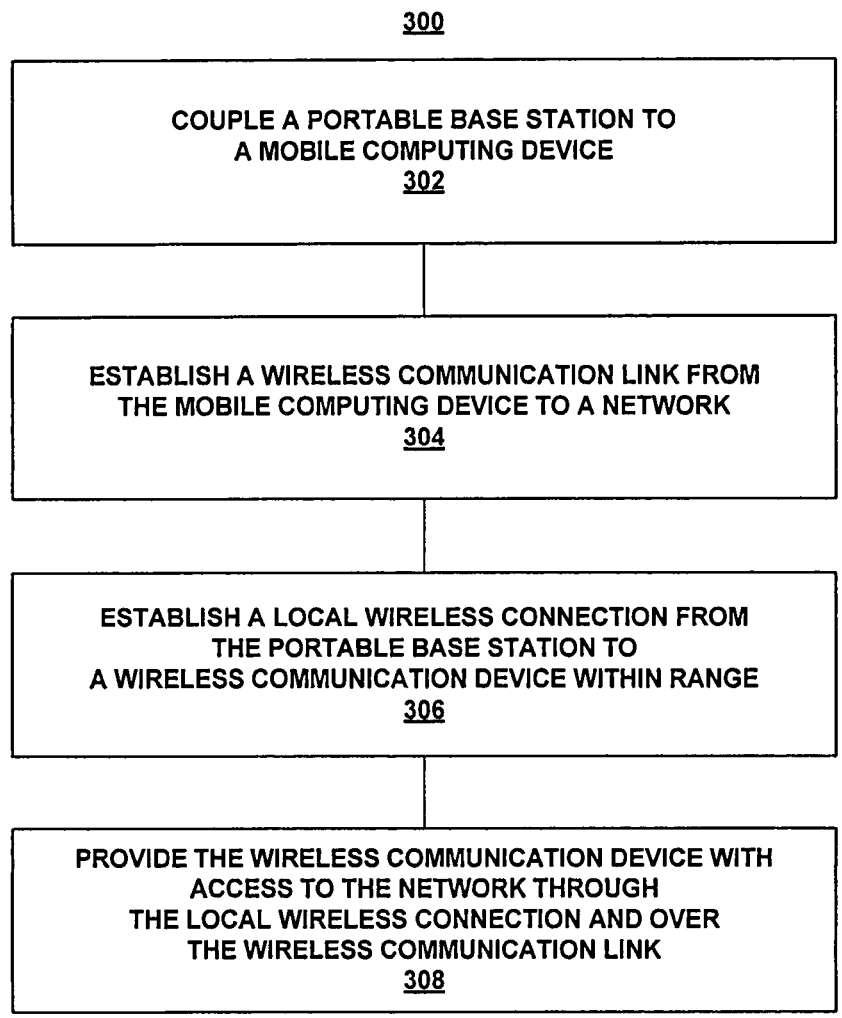
FIG. 3 illustrates a logic flow in accordance with various embodiments.

FIG. 3 illustrates one embodiment of a logic flow 300. In various embodiments, logic flow 300 may be performed by various systems and/or devices and may be implemented as hardware, software, and/or any combination thereof, as desired for a given set of design parameters. For example, logic flow 300 may be implemented by a logic device (e.g., computer) and/or logic (e.g., computer program instructions) to be executed by a logic device. For purposes of illustration, and not limitation, reference is made to FIG. 1.

Logic flow 300 may comprise coupling a portable base station 102 to a mobile computing device 104 (block 302) and establishing a wireless communication link 108 from the mobile computing device 104 to a network 106 (e.g., voice and/or data communication network) (block 304).

Logic flow 300 may comprise establishing a local wireless connection (e.g., WiFi connection 116, Bluetooth® connection 120, cordless telephone channel 124, cordless telephone channel 136) from the portable base station 102 to a wireless communication device (e.g., PC 118, TV 122, cordless telephone handset 126, cordless telephone handset 138) within range (block 306) and providing the wireless communication device with access to the network 106 through the local wireless connection and over the wireless communication link 108 (block 308).

In various embodiments, logic flow 300 may comprise, or be implemented as, executable computer program instructions. The executable computer program instructions may be implemented by software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

In various embodiments, logic flow 300 may comprise, or be implemented as, executable computer program instructions stored in an article of manufacture and/or computer-readable storage medium. The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Although some embodiments may be illustrated and described as comprising exemplary functional components or modules performing various operations, it can be appreciated that such components or modules may be implemented by one or more hardware components, software components, and/or combination thereof.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, or any combination thereof.

Some embodiments may be implemented as an article of manufacture comprising a computer-readable storage medium to store executable computer program instructions for performing various operations as described herein. In such embodiments, a computer may include any suitable computer platform, device, system, or the like implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a wireless portable base station communicable with a local wireless network, the wireless portable base station configured to:
  establish a first wireless communication link with at least one local wireless device over the local wireless network; and
  form a wireless access point when a mobile computing device is coupled with the wireless portable base station, wherein the mobile computing device is in communication with a second wireless network over a second wireless communication link,
  wherein the wireless access point formed when the wireless portable base station is coupled to the mobile computing device provides the at least one local wireless device with access to the second wireless network through the first wireless communication link and over the second wireless communication link, and
  wherein the wireless portable base station cannot communicate with the second wireless network unless coupled with the mobile computing device.

2. The apparatus of claim 1, wherein the wireless access point is formed when the mobile computing device is coupled with the wireless portable base station using a direct physical connection.

3. The apparatus of claim 1, the wireless portable base station and the mobile computing device coupled by a wired connection.

4. The apparatus of claim 1, the wireless portable base station and the mobile computing device coupled by a short range wireless connection.

5. The apparatus of claim 1, the wireless portable base station to supply power to the mobile computing device when coupled.

6. The apparatus of claim 1, the second wireless network comprising a cellular telephone network providing one or more of voice communications and wireless wide area network (WWAN) data communications.

7. The apparatus of claim 1, the first wireless communication link comprising a wireless local area network (WLAN) connection.

8. The apparatus of claim 1, the first wireless communication link comprising a short range wireless connection.

9. The apparatus of claim 1, the first wireless communication link comprising a cordless telephone channel.

10. The apparatus of claim 1, the at least one local wireless device comprising a personal computer.

11. The apparatus of claim 1, the at least one local wireless device comprising a media device.

12. The apparatus of claim 1, the at least one local wireless device comprising a cordless telephone handset.

13. The apparatus of claim 12, the wireless portable base station to transmit a ringer signal to the cordless telephone handset.

14. The apparatus of claim 1, the wireless portable base station comprising a telephone port to connect to a cordless telephone base.

15. The apparatus of claim 1, the wireless portable base station to store media content.

16. The apparatus of claim 1, the wireless portable base station comprising a voice/data gateway for communicating voice and other data to and from the mobile computing device.

17. The apparatus of claim 16, the voice/data gateway comprising a router for directing voice and other data.

18. The apparatus of claim 1, the wireless portable base station comprising a WLAN transceiver.

19. The apparatus of claim 1, the wireless portable base station comprising a cordless telephone transceiver.

20. The apparatus of claim 1, the wireless portable base station comprising a personal area network (PAN) transceiver.

21. A method comprising:
coupling a wireless portable base station operable on a local wireless network to a mobile computing device operable on a second wireless network to cooperatively form a wireless access point;
establishing a local wireless connection between the wireless portable base station and a wireless communication device within range;
establishing a second wireless communication link between the mobile computing device and the second wireless network; and
providing the wireless communication device with access to the second wireless network through the local wireless connection and over the second wireless communication link via the wireless access point formed when the wireless portable base station is coupled to the mobile computing device, and wherein the wireless portable base station cannot communicate with the second wireless network unless coupled with the mobile computing device.

22. The method of claim 21, the local wireless connection comprising a wireless local area network (WLAN) connection.

23. The method of claim 21, the local wireless connection comprising a short range wireless connection.

24. The method of claim 21, the local wireless connection comprising a cordless telephone channel.

25. An article of manufacture comprising a non-transitory computer-readable storage medium storing executable computer program instructions that when executed by a computer cause the computer to:

establish a wireless communication link to a network from a mobile computing device coupled to a wireless portable base station, wherein the mobile computing device and the portable base station, when coupled, form a wireless access point, and wherein the wireless portable base station cannot communicate with the network unless coupled with the mobile computing device;

establish a local wireless connection from the access point to a wireless communication device within range; and provide, via the access point formed when the mobile computing device and the wireless portable base station are coupled, the wireless communication device with access to the network through the local wireless connection and over the wireless communication link.

26. The article of claim 25, the local wireless connection comprising a wireless local area network (WLAN) connection.

27. The article of claim 25, the local wireless connection comprising a short range wireless connection.

28. The article of claim 25, the local wireless connection comprising a cordless telephone channel.

* * * * *